United States Patent [19]
Paranto et al.

[11] Patent Number: 4,686,681
[45] Date of Patent: Aug. 11, 1987

[54] CONTINUOUS WAVE-MID-INFRARED GAS LASER UTILIZING RF EXCITATION

[75] Inventors: Joseph N. Paranto, Albuquerque, N. Mex.; John H. S. Wang; Larry Williams, both of Rancho Palos Verdes, Calif.

[73] Assignee: Hughes Aircraft Company, Los Angeles, Calif.

[21] Appl. No.: 761,274

[22] Filed: Aug. 1, 1985

[51] Int. Cl.[4] .................. H01S 3/097; H01S 3/223
[52] U.S. Cl. .................................. 372/82; 372/55
[58] Field of Search .............. 372/55, 58, 59, 61, 372/69, 76, 82, 89, 90

[56] References Cited
U.S. PATENT DOCUMENTS
3,748,594  7/1973  Pugh ........................... 372/82
4,031,484  6/1977  Freiberg et al. ............... 372/89

OTHER PUBLICATIONS
Nichols et al., "Radio Frequency Preionization in a Supersonic Transverse Electrical Discharge Laser", IEEE J. QE, Aug. 1972, pp. 718–719.

Primary Examiner—Gene Wan
Attorney, Agent, or Firm—Ronald L. Taylor; A. W. Karambelas

[57] ABSTRACT

An improved transverse gas flow RF pumped waveguide laser has been developed utilizing RF discharge waveguide technology in a mid-infrared laser. A potential application has been identified in a continuous wave gas laser. For the laser, the flowing gas provides efficient cooling so that high output power per unit gain length can be achieved.

8 Claims, 5 Drawing Figures

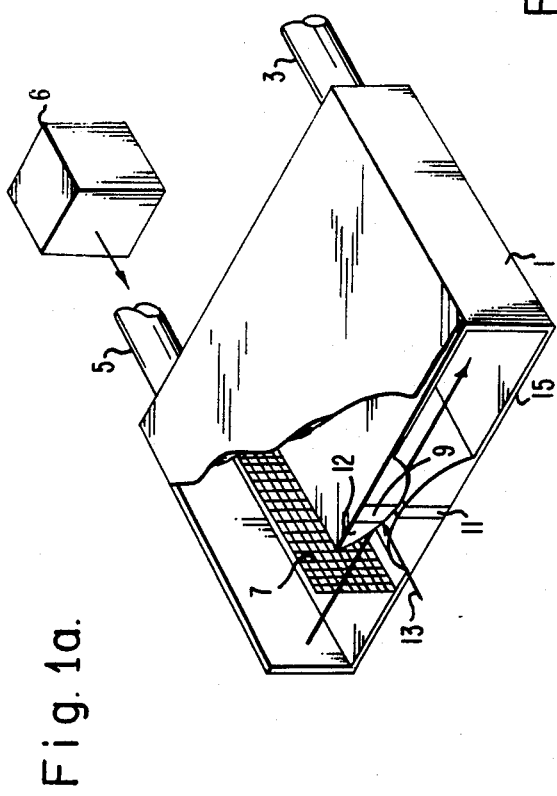
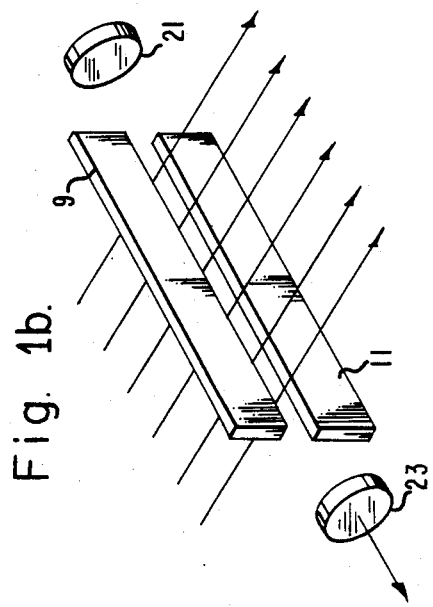
Fig. 1a.
Fig. 1b.

4,686,681

CONTINUOUS WAVE-MID-INFRARED GAS LASER UTILIZING RF EXCITATION

CROSS REFERENCE TO RELATED PATENT APPLICATION

A patent application entitled "RF-Pumped Infrared Laser Using Tranverse Gas Flow" bearing application Ser. No. 470,409, and filed on Feb. 28, 1983 by John H. S. Wang et al and assigned to Hughes Aircraft Company describes and claims a laser upon which the present case is an improvement therefor.

BACKGROUND OF THE INVENTION

1. Field of the Invention

The invention relates generally to the field of transverse gas flow RF pumped waveguide lasers, and specifically to continuous wave mid-infrared lasers.

2. Description of the Related Art

Transverse gas flow radio frequency excited discharge waveguide laser technology development by the assignee has included continuous wave and pulse excitation for infrared $CO_2$ gas lasers, and pulse excitation mid-infrared chemical lasers.

In particular, the development of such lasers began with radio frequency waveguide $CO_2$ gas lasers that operated in the continuous wave mode at far-infrared with a wavelength of 10.6 microns. The RF waveguide laser was then utilized as a $CO_2$ gas laser in the pulse mode at far-infrared with a wavelength of 10.6 microns. Next, a RF waveguide laser in the pulse in the mid-infrared was implemented with HF and DF kinetics. Finally, a transverse gas flow RF waveguide laser was developed that was able to operate in various embodiments in a pulse or continuous wave mode at far-infrared with a wavelength of 10.6 microns for a $CO_2$ gas laser, a pulse mode at wavelengths of 2.7 or 3.8 microns for HF or DF gas lasers, respectively, and finally a pulse mode mid-infrared rare gas laser.

SUMMARY OF THE INVENTION

It is an important object of the invention to provide a transverse gas flow radio frequency discharge waveguide laser capable of operating as a continuous wave mode mid-infrared gas laser.

Another object of the invention is to operate the laser at a relatively high gas flow velocity to enhance efficient cooling of the laser medium and the electrodes, as well as increased replenishment rate of deterent gases, so that high laser output per unit gain length can be extracted.

Yet another object of the invention is to provide a hydrogen-fluoride or deuterium-fluoride laser as the gas laser.

BRIEF DESCRIPTION OF THE DRAWINGS

Various other objects, advantages and meritorious features of the invention will become more fully apparent from the specification, appended claims and accompanying drawing sheets.

The features of a specific embodiment of the invention are illustrated in the drawings, in which:

FIGS. 1a, 1b and 1c are schematic diagrams of the transverse gas flow mid-infrared continuous wave RF-pumped gas laser system;

DESCRIPTION OF THE PREFERRED EMBODIMENT

Figure 1C:
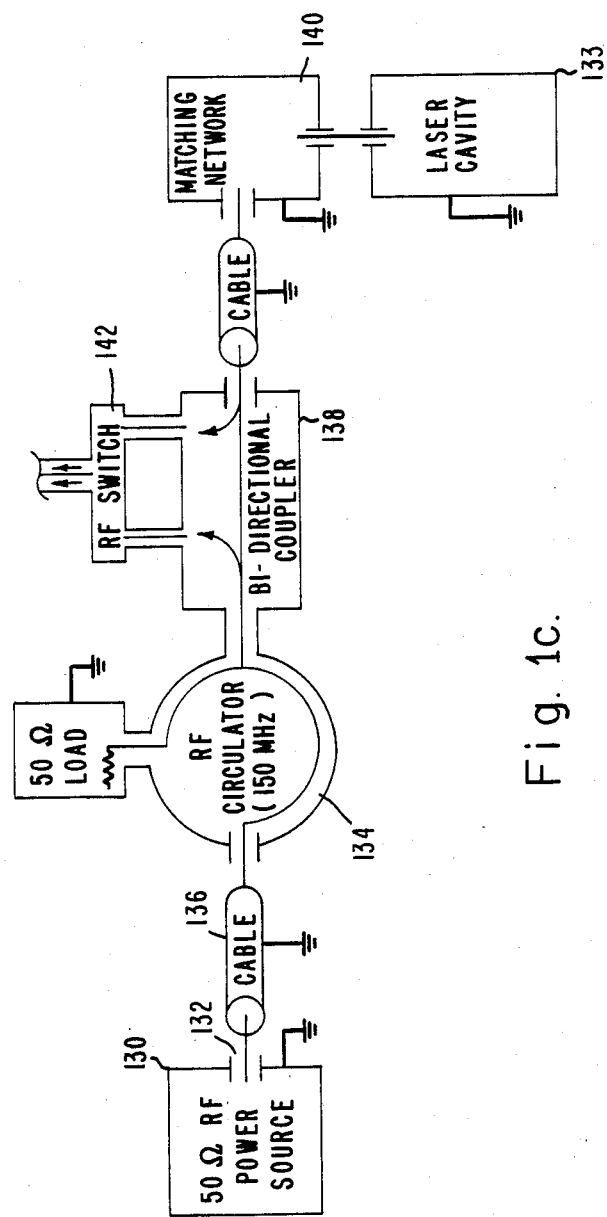

Referring to FIGS. 1a, 1b, 1c, 2 and 3 by the characters of reference, there is illustrated a laser system for carrying out the objects of the invention.

In a prior patent application, U.S. Ser. No. 470,409, noted supra, the transverse gas flow laser system, as illustrated in FIGS. 1a and 1b, is described in detail. The laser system consists of a solid metal body 1 having two ports 3, 5 for gas circulation connected to a gas recirculation pump 76. A metal screen is spatially offset from the RF excitation electrodes 9, 11 to provide uniform gas flow within the discharge region 13. The upper electrode 9 is set into a section of nonconducting material 12 providing insulation of the electrode from the metal body 1. The lower electrode 11 is attached to the laser body 15 to provide a common ground. The optics consist of a total reflector or mirror 21 and a partial reflector 23. The electrode faces are polished smooth to minimize diffractive and scattering losses. The optics are spatially offset from the bore. This sets to minimize the coupling while at the same time preventing discharge to the reflectors 21 and 23.

The electronic circuit is illustrated in FIG. 1c and includes a 50 ohms RF power source 130 which operates in a continuous wave mode. The off-the-shelf cw power source used herein is manufactured by Amplifier Research with a model number of 100LM9, and is referred to as an RF Amplifier. It has a frequency capability of 1 to 200 megahertz, a maximum power of 200 watts linear RF, a minimum gain of 53 db, and a flatness of plus or minus 1.5 db.

Energy from source 130 is transmitted through an aperture 132 to an RF circulator 134 having a 50 ohm lead 136 attached, and from there to a cw forward/reflecting power meter 138. The power meter 138 is used to monitor the forward and reflected waves from the laser cavity 133 through a matching network 140 and a RF switch 142. The matching network 140 matches the inductance of the cavity 133 to the source 130 in order to achieve efficient power coupling into the laser medium. Although absorbed power in the gas was measured, all efficiencies quoted hereafter are referenced to the RF power from the power source 130.

Figure 3:
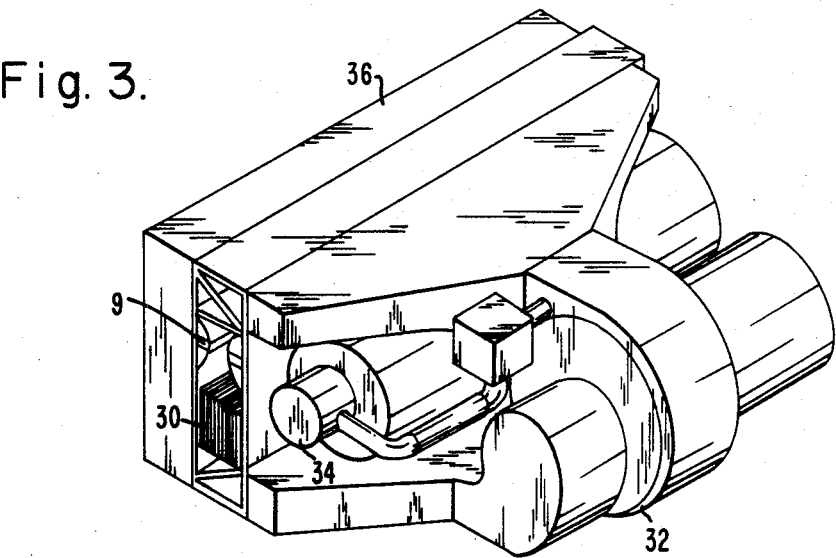
FIG. 3 illustrates a compact recirculating gas DF laser package.

It will be appreciated that a much faster gas flow can be achieved by recirculating the laser gas. A design for such a recirculating gas laser is illustrated in FIG. 3. This design includes the electrodes 9, 11 of FIG. 1a, a chemical scrubber and heat exchanger 30, a gas recirculator 32, a gas supply bottle 34 and a chassis 36 having the RF power supply electronics. An increase in the gas replenishment rate will result in an order of magnitude improvement of laser power. A scrubber to eliminate the generated HF or DF molecules is also required along with a small replenishment supply of $SF_6$ and $H_2$ or $D_2$.

Continuous wave (cw) oscillation can be obtained in the 2.7$\mu$ (micron) wavelength for hydrogen-fluoride (HF) and the 3.8$\mu$ (micron) wavelength for deuterium-fluoride (DF) laser systems of FIGS. 1a–c by utilizing the transverse flow (TF) hybrid waveguide laser configuration. This configuration was used previously to demonstrate efficient lasing for both 2.7µ HF and 3.8µ DF with pulsed excitation as already noted. The transverse flow configuration provides a high replenishment rate of the laser which is necessary for cw operation. The replenishment rate of a system is determined by the gas velocity and the distance the gas travels within the discharge region 13. A comparable replenishment rate in the waveguide configuration would therefore be difficult to obtain because of the small cross-section of the bore and large pressure drop across the discharge region 13. This high replenishment rate is necessary in order to allow the deterent HF or DF, which is generated during the chemical reaction, to be swept out of the gain regions. As an example, for an HF system, the laser gas consists of $SF_6$, He and $H_2$. Alternatively, for a DF system, the laser gas consists of $SF_6$, He, and $D_2$. For the DF system, the RF discharge disassociates the $SF_6$ to produce a fluoride atom which, in turn, reacts with $D_2$ to prodcue vibrationally excited DF molecules. When the excited molecule relaxes to its ground state, it emits a photon at a wavelength of 3.7–4.0µ (microns). The formulas for the above are as given infra:

$$SF_6 + e \text{ goes to } SF_5 + F + e$$

$$F + D_2 \text{ goes to } DF(v) + D$$

$$DF(v) \text{ goes to } DF(v-1) + h\nu(3.7-4.0\mu)$$

The generated ground state molecules prevent the laser from oscillating, especially on the low $J(v=1\rightarrow 0)$ transitions. By increasing the replenishment rate via increased gas velocity, the efficiency will increase, but will never reach pulsed mode efficiencies. The maximum expected electrical efficiency is 2%.

Figure 2:
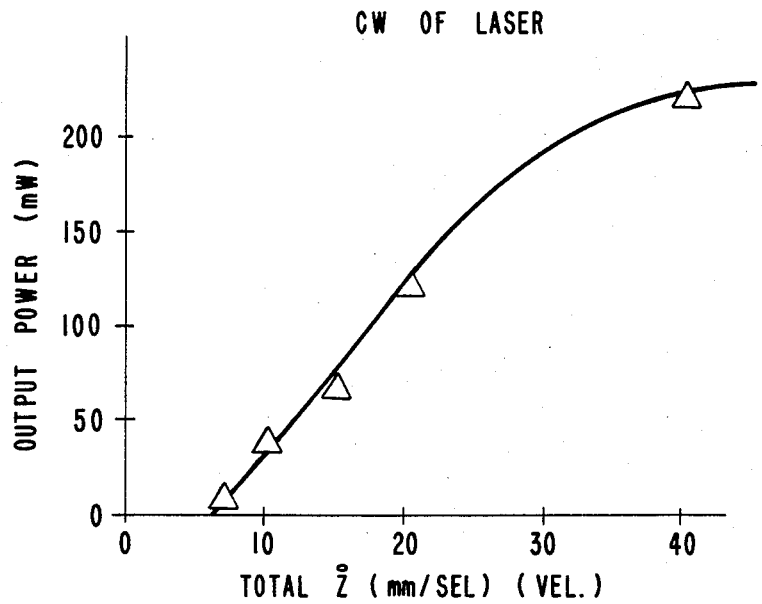
FIG. 2 is a graph illustrating chemical laser output power vs. total velocity for the laser system of FIGS. 1a, 1b and 1c.

The 3.8µ DF laser was demonstrated using cw RF technology wherein a maximum output power of 0.25 watts was achieved. An input power of 85 watts, with approximately 45 watts being reflected back in the associated electronics shown in FIG. 1c, was used to characterize the laser. The laser gas ratio $He:SF_6:O_2$ was 200:1:0.5 for varied flow rates of lasant wherein the laser has a 200 centimeter gain length and the discharge for cavity 133 is uniform throughout the length. The output power increased as the velocity or flow rate increased as shown in FIG. 2. This is due to the increased velocity and hence an increased replenishment rate. Operating pressure for the laser system was between 60 to 80 Torr, varying with increased flow rates. It will be appreciated that velocity is directly proportional to pressure in the laser system.

It is axiomatic that the lasant must be kept at a cool temperature for good efficiency 6. As the temperature increases, the population in the $V_2$ vibrational mode increases, and the laser efficiency decreases. Improved cooling of the laser gas is provided by flowing gas. Small decreases in efficiency can be retrieved by optimizing the lasant mixture to allow for higher powers.

It will be appreciated that the system as described can be utilized as a relatively small compact cw laser at the mid-IR wavelength.

While the above referenced embodiment of the invention has been described in considerable detail with respect to the system, it will be appreciated that other modifications and variations thereon may be made by those skilled in the art without departing from the true spirit and scope of the invention.

What is claimed is:

1. A laser system having a mid-infrared radio frequency transverse gas flow discharge waveguide, comprising:
   (a) a pair of electrode means that face one another for defining a discharge region therebetween;
   (b) laser gas means selected from the group of mixtures of hydrogen-fluoride and deuterium-fluoride, said laser gas means being at least partially confined in the laser discharge region between said electrode means for operation as the lasing medium;
   (c) means for coupling continuous wave radio frequency energy to said electrode means in order to effect an electrical discharge in said laser gas means in the discharge region;
   (d) pair of optical means that face one another and confining therebetween said electrode means for defining therebetween a longitudinal direction through the discharge region; and
   (e) means for flowing said laser gas means in a direction transverse to said longitudinal direction through the discharge region of said electrode means so as to replenish said laser gas means in the discharge region.

2. The laser system of claim 1 wherein said flowing means recirculates said laser gas means through a chemical scrubber.

3. A mid-IR RF transverse gas flow discharge waveguide laser device comprising:
   (a) a pair of electrodes facing one another and defining a discharge region therebetween;
   (b) a laser gas medium selected from the group of mixtures of hydrogen-fluoride and deuterium-fluoride, said medium being at least partially confined in said laser discharge region between said two electrodes;
   (c) means for coupling continuous wave radio frequency energy to said two electrodes in order to effect an electrical discharge in said laser gas medium in the discharge region;
   (d) a pair of optical elements facing one another and confining therebetween said two electrodes, said optical element pair defining therebetween a longitudinal direction through the discharge region; and
   (e) means for flowing said laser gas medium in a direction transverse to the longitudinal direction through the discharge region so as to replenish said laser gas medium in the discharge region.

4. The laser device of claim 3 wherein said laser gas medium is derived from of a predetermined flowing gas mixture of He, $SF_6$ and $H_2$.

5. The laser device of claim 3 wherein said laser gas medium is derived from of a predetermined flowing gas mixture of $D_2$, $SF_6$ and He.

6. The laser device of claim 3 wherein said flowing means recirculates said laser gas medium through a chemical scrubber.

7. A continuous wave laser configuration having a radio frequency transverse gas flow discharge waveguide operative to function in the mid-infrared region, comprising:
   (a) a pair of conductive electrodes facing one another and defining a discharge region therebetween;
   (b) a hydrogen-fluoride laser gas medium at least partially confined in the laser discharge region between said two electrodes;
   (c) means for coupling continuous wave radio frequency energy to said two electrodes in order to effect an electrical discharge in said hydrogen-fluoride laser gas medium in the discharge region;

(d) a pair of optical elements facing one another and confining therebetween said two electrodes, said optical element pair defining therebetween a longitudinal direction through the discharge region; and (e) a chassis containing a closed loop recirculation system including:

gas recirculator means for regulating the velocity of the flow of a mixture of He, $SF_6$, and He in a direction transverse to the longitudinal direction through the discharge region;

scrubber means downstream from the discharge region for removing hydrogen-fluoride molecules remaining in the gas flow; and means for replenishing said mixture prior to entering said laser discharge region.

8. A radio frequency transverse gas flow discharge waveguide operative to function in the continuous wave mode at the mid-infrared region, comprising:

(a) a pair of electrodes facing one another and defining a discharge region therebetween;

(b) a deuterium-fluoride laser gas medium at least partially confined in the laser discharge region between said two electrodes;

(c) means for coupling continuous wave radio frequency energy to said two electrodes in order to effect an electrical discharge in said deuterium-fluoride laser gas medium in the discharge region;

(d) a pair of optical elements facing one another and confining therebetween said two electrodes, said optical element pair defining therebetween a longitudinal direction through the discharge region; and (e) a chassis containing a closed loop recirculation system including:

gas recirculator means for regulating the velocity of the flow of a mixture of $D_2$, $SF_6$, and He in a direction transverse to the longitudinal direction through the discharge region;

scrubber means downstream from the discharge region for removing deuterium-fluoride molecules remaining in the gas flow; and means for replenishing said mixture prior to entering said laser discharge region.

* * * * *